Nov. 23, 1954  W. L. MAYBERRY  2,694,932
ENGINE STARTER AND CLUTCH THEREFOR
Filed Oct. 20, 1952  2 Sheets-Sheet 1

William L. Mayberry
INVENTOR.

BY *Clarence A. O'Brien
and Harvey B. Jacobson*
Attorneys

Nov. 23, 1954 W. L. MAYBERRY 2,694,932
ENGINE STARTER AND CLUTCH THEREFOR
Filed Oct. 20, 1952 2 Sheets-Sheet 2
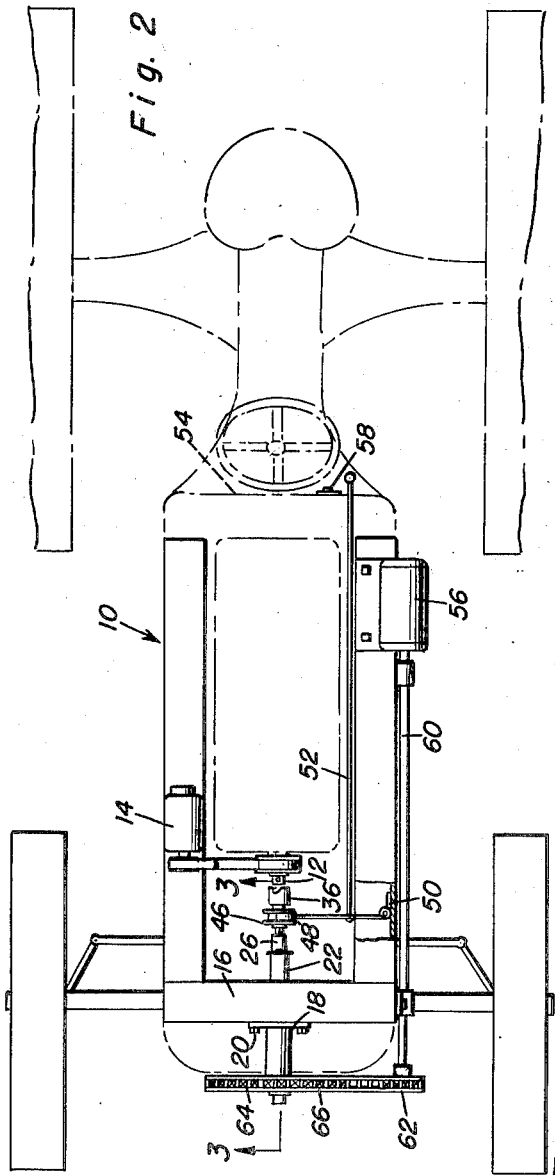
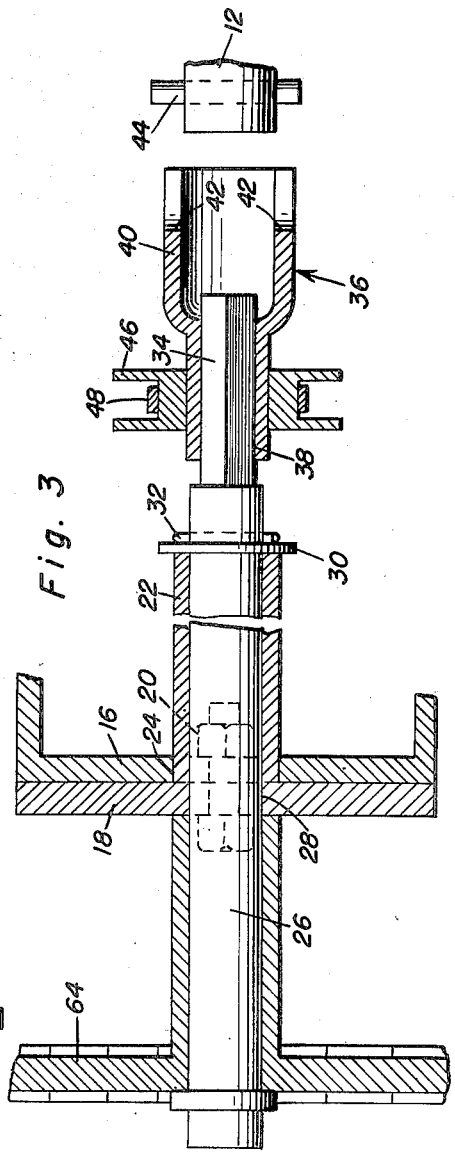
William L. Mayberry, INVENTOR.

United States Patent Office 2,694,932
Patented Nov. 23, 1954

2,694,932

ENGINE STARTER AND CLUTCH THEREFOR

William L. Mayberry, Jetmore, Kans.

Application October 20, 1952, Serial No. 315,698

2 Claims. (Cl. 74—6)

This invention relates to new and useful improvements in engine starters and the primary object of the present invention is to provide a device for rotating the engine shaft of a tractor and which device is actuated by the tractor driver while seated.

Another important object of the present invention is to provide an engine starter for tractors usually requiring crank handles and which engine starter involves a driven shaft that is quickly and readily applied to or removed from the front end of a tractor in a convenient manner.

A further object of the present invention is to provide an engine starter unit involving a clutch actuating rod slidably carried by the dash panel of the tractor on which the unit is mounted along side of a starter motor button switch, whereby the unit may be clutched with the engine shaft and then operated by one hand of the tractor driver.

A still further aim of the present invention is to provide an engine starter of the aforementioned character that is simple and practical in construction, strong and reliable in use, small and compact in structure, efficient and durable in operation, inexpensive to manufacture, install and service, and otherwise well adapted for the purposes for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2 is a plan view of Figure 1;

Figure 3 is an enlarged longitudinally vertical sectional view taken substantially on the plane of section line 3—3 of Figure 2;

Figure 5:
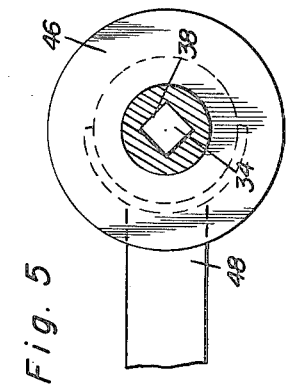
Figure 1:
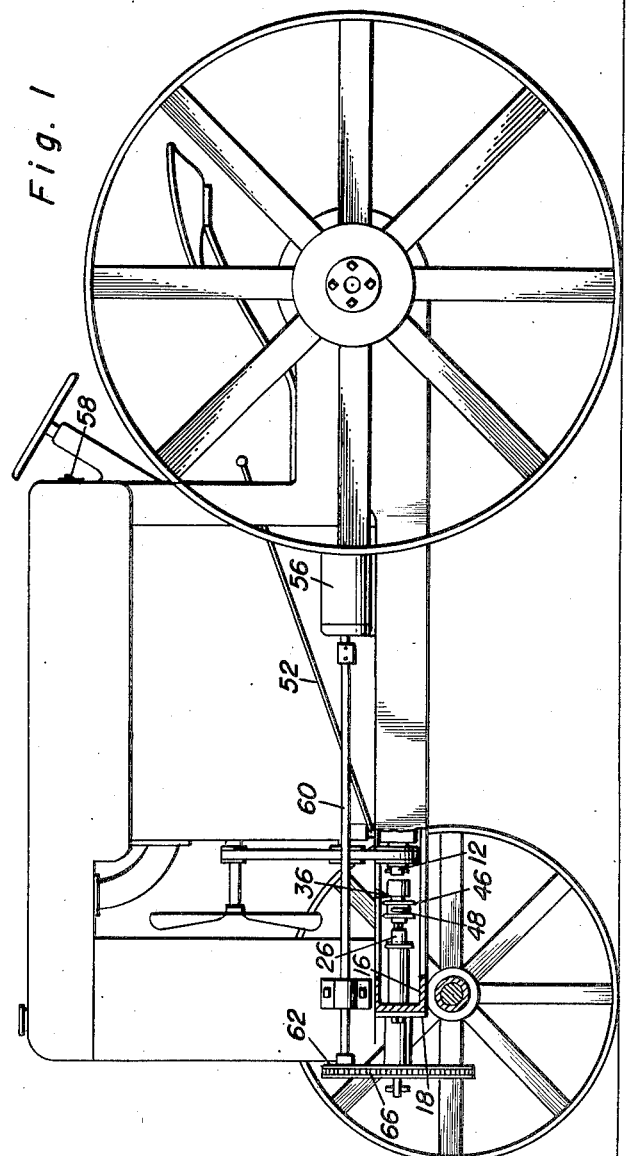
Figure 1 is a side elevational view of a tractor and showing the invention mounted thereon.

Referring now to the drawings in detail, wherein for the purpose of illustration, there is disclosed a preferred embodiment of the present invention, the numeral 10 represents a tractor having the usual engine shaft 12 to which the generator 14 is operatively connected. The tractor 10 also includes a front transverse frame member 16 that is disposed in front of the engine shaft 12.

A mounting plate 18 is secured against the frame member 16 by fasteners 20 and fixedly supports the forward end of a horizontal bearing sleeve 22 that extends rearwardly through an opening 24 in the frame member 16.

A driven shaft 26 extends through bearing sleeve 22 and a central aperture or opening 28 in plate 18. A washer 30 is engaged over shaft 26 and is held against the forward end of shaft 26 by a cotter pin 32 that extends through a transverse aperture in the shaft 26 forwardly of the rear multi-sided end 34 of the shaft 26.

Figure 4:
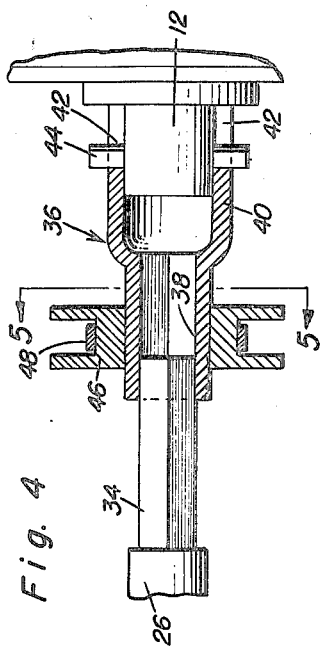
Figure 4 is a fragmentary view similar to Figure 3 but showing the coupling member engaged with the engine shaft; and, Figure 5 is a vertical sectional view taken substantially on the plane of section line 5—5 of Figure 4.

A coupling member 36 is employed for coupling shaft 26 to the engine shaft 12. The forward end of coupling member 36 is formed with a multi-sided bore 38 that receives the end 34 and the forward socketed end 40 of member 36 is adapted to slip over the forward end of shaft 12. Socketed end 40 is formed with a pair of diametrically opposed slots 42 that will engage the ends of a transverse pin 44 carried by the forward end of shaft 12 when socketed end 40 is slipped over the forward end of shaft 12 to couple the shafts 26 and 12 together as shown in Figure 4.

The forward end of coupling member 36 fixedly supports a pulley 46 that is engaged by a fork 48. Fork 48 is pivotally attached, as at 50, to the tractor 10 and is attached to the forward end of an actuating rod 52 that is slidably received in a slot in the instrument or dash panel 54 of the tractor. The rod 52 is pulled rearwardly to swing fork 48 and cause the coupling member 36 to move from its position shown in Figure 3 to that shown in Figure 4.

An electric starter motor 56 is suitably secured to one side of the tractor 10 and includes a switch button 58 that is mounted on panel 54. The armature shaft of motor 56 is suitably coupled to the rear end of a shaft 60 that is journaled in bearings on the tractor. The forward end of shaft 60 fixedly supports a sprocket 62 that is connected to a sprocket 64 fixed on the forward end of shaft 26 by a sprocket chain 66.

In practical use of the present invention, the rod 52 is pulled rearwardly in order to couple shafts 26 and 12 together (Figure 4) after which button 58 is depressed to complete a circuit to motor 56 which is sufficient to rotate shaft 60 and hence shafts 26 and 12 for the purpose of starting the engine of the tractor.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

Although the starter is shown as being mounted on the left side of the tractor, it may also be mounted on the right side of the tractor. Also pin 44 in some instances may be carried by shaft 26 or coupling member 36 to enter an accommodating slot in shaft 12. Generator 14 may be mounted near the rear of the engine rather than forwardly thereof as shown in Figure 2.

What is claimed as new is as follows:

1. In a tractor including an engine shaft and a front transverse frame member disposed in front of the engine shaft, a starter for the engine comprising a mounting plate secured to the frame member and having an opening therein, said frame member being provided with an opening slightly larger than the opening in the plate and in registry with the opening in the plate, a bearing sleeve extending through the opening in the frame member and fixed to the plate, a driven shaft extending through the bearing sleeve and the opening in the plate and having a rear multi-sided end, a slidable coupling member having a multi-sided forward bore accommodating the rear end of the shaft, a pin extending transversely through the forward end of the engine shaft and having its ends projecting outwardly from diametrically opposite sides of the engine shaft, said coupling member having a rear socketed end adapted to slip over the forward end of the engine shaft and provided with a pair of diametrically opposed slots for receiving the ends of the pin, means connected to the coupling member for sliding the same selectively over and from the forward end of the engine shaft, and a starter motor operatively connected to the forward end of the driven shaft for rotating the same.

2. For use in a tractor having a projecting engine shaft and a frame including a frame member in spaced relation to the end of the engine shaft, an engine starter comprising a mounting plate adapted to be secured to the frame member and having an opening therein, a bearing sleeve fixed to the plate in registry with said opening, said sleeve being in alignment with the engine shaft, a driven shaft extending through said opening and journaled in said bearing sleeve, said driven shaft including a multi-sided end projecting toward said engine shaft, a coupling member having a multi-sided bore accommodating the multi-sided end of the shaft and slidable thereon, a clutch element adapted to be fixed on the projecting end of the engine shaft, said coupling member having a socketed end adapted to slip over the projecting end of the engine shaft for engagement with said clutch element, means connected to the coupling and operative for sliding the same selectively into and out of engagement with said clutch element, and a starter motor operatively connected to the driven shaft for rotating the same.

References Cited in the file of this patent

UNITED STATES PATENTS

| Number | Name | Date |
|---|---|---|
| 1,164,006 | Mills | Dec. 14, 1915 |
| 1,174,352 | Richards | Mar. 7, 1916 |
| 1,179,815 | Erfman | Apr. 18, 1916 |
| 1,232,892 | Bush | July 10, 1917 |

FOREIGN PATENTS

| Number | Country | Date |
|---|---|---|
| 546,386 | France | Aug. 18, 1922 |